(12) United States Patent
Kim et al.

(10) Patent No.: US 11,327,220 B2
(45) Date of Patent: May 10, 2022

(54) DISPLAY APPARATUS INCLUDING A SUPPORT SLOT AND A SUPPORT PROTRUSION

(71) Applicant: SAMSUNG ELECTRONICS CO., LTD., Suwon-si (KR)

(72) Inventors: Yeon Ho Kim, Suwon-si (KR); Dae Jin Kim, Suwon-si (KR); Heong Seog Lee, Suwon-si (KR); Hyun Jun Jung, Suwon-si (KR); Hyun Joong Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/255,583

(22) PCT Filed: Jun. 25, 2019

(86) PCT No.: PCT/KR2019/007676
§ 371 (c)(1),
(2) Date: Dec. 23, 2020

(87) PCT Pub. No.: WO2020/004913
PCT Pub. Date: Jan. 2, 2020

(65) Prior Publication Data
US 2021/0165158 A1    Jun. 3, 2021

(30) Foreign Application Priority Data

Jun. 27, 2018    (KR) .................. 10-2018-0073737

(51) Int. Cl.
*F21V 8/00* (2006.01)
*G02F 1/1333* (2006.01)

(52) U.S. Cl.
CPC ........... *G02B 6/0088* (2013.01); *G02B 6/005* (2013.01); *G02F 1/133317* (2021.01)

(58) Field of Classification Search
CPC .................. G02B 6/0088; G02F 1/133317
See application file for complete search history.

(56) References Cited

U.S. PATENT DOCUMENTS

2006/0212797 A1*    9/2006    Kao ................... G02B 6/0088
                                                            715/202
2016/0356952 A1    12/2016    Kawabata et al.

FOREIGN PATENT DOCUMENTS

JP        2005-121758 A      5/2005
KR    10-2007-0101483 A    10/2007
(Continued)

OTHER PUBLICATIONS

International Search Report (PCT/ISA/210), issued by International Searching Authority in corresponding International Application No. PCT/KR2019/007676, dated Oct. 8, 2019.

*Primary Examiner* — Keith G. Delahoussaye
(74) *Attorney, Agent, or Firm* — Sughrue Mion, PLLC (57) ABSTRACT

The present disclosure relates to a display apparatus including a display panel, a backlight disposed in the rear of the display panel, an optical sheet disposed between the display panel and the backlight and on which support slots are provided, and a middle mold including support protrusions to support the optical sheet. The support protrusion is formed such that a central portion of a front surface thereof has an updown width larger than that of the support slot and opposite sides of the front surface thereof have an up-down width smaller than that of the support slot, so that the front end of the support protrusion easily passes through the support slot and the optical sheet is prevented from being separated from the support protrusion.

11 Claims, 10 Drawing Sheets

(56) References Cited

FOREIGN PATENT DOCUMENTS

| | | | |
|---|---|---|---|
| KR | 10-2011-0136091 A | | 12/2011 |
| KR | 101488235 B1 | * | 2/2015 |
| WO | 2014054519 A1 | | 4/2014 |

* cited by examiner

DISPLAY APPARATUS INCLUDING A SUPPORT SLOT AND A SUPPORT PROTRUSION

TECHNICAL FIELD

The present disclosure relates to a display apparatus including a support protrusion for supporting an optical sheet.

BACKGROUND ART

A display apparatus is a device that receives an image signal and displays an image, such as a television or a monitor.

Such a display apparatus includes a display panel to display an image, a backlight to supply light to the display panel, optical sheets disposed between the display panel and the backlight to improve characteristics of light supplied to the display panel, and a middle mold to support the optical sheets.

The optical sheets include support slots provided at an upper portion thereof and the middle mold includes support protrusions installed through the support slots, so that the optical sheets are supported on the middle mold.

DISCLOSURE

Technical Problem

The present disclosure is directed to providing a display apparatus including a support protrusion capable of supporting an optical sheet more stably.

Technical Solution

One aspect of the present disclosure provides a display apparatus including a display panel, a backlight disposed in the a of the display panel, an optical sheet disposed between the display panel and the backlight, and a middle mold configured to support the optical sheet, wherein the optical sheet includes a support slot extending left and right, the middle mold includes a support protrusion to support the optical sheet through the support slot, the support protrusion includes a sheet support portion protruding from the middle mold and extending left and right, and a locking portion extending in an up-down direction from a central portion of a front end of the sheet support portion, a central portion of a front end of the support protrusion on which the locking portion is formed has an up-down width larger than an up-down width of the support slot, and opposite sides of the front end of the support protrusion have an up-down width smaller than the up-down width of the support slot.

The locking portion may extend downward from the front end of the sheet support portion.

The support protrusion may include a protrusion portion protruding upward from a central portion of an upper surface of the sheet support portion, the protrusion portion may be positioned in a rear of the locking portion, and a region in the support protrusion where the protrusion portion is formed may have an up-down width smaller than the up-down width of the support slot.

The support protrusion may include a pair of through portions extending downward from opposite sides of the front end of the sheet support portion, and the opposite sides of the front end of the support protrusion on which the pair of through portions are provided may have the up-down width smaller than the up-down width of the support slot.

The locking portion may extend upward from the front end of the sheet support portion.

The support protrusion may include a pair of through portions extending upward from opposite sides of the front end of the sheet support portion, and the opposite sides of the front end of the support protrusion on which the pair of through portions are provided may have the up-down width smaller than the up-down width of the support slot.

The locking portions may extend upward and downward from the central portion of the front end of the sheet support portion, respectively.

The support protrusion may include two pairs of through portions extending upward and downward from opposite sides of the front end of the sheet support portion, respectively, and the opposite sides of the front end of the support protrusion on which the two pair of through portions are provided may have the up-down width smaller than the up-down width of the support slot.

The optical sheet may include at least one of a diffuser sheet to diffuse light received from the backlight, a dual brightness enhancement film (DBEF) sheet which is a high-brightness prism sheet, and a quantum dot sheet to improve color reproducibility.

The optical sheet may include a plurality of sheet extensions extending from an upper end thereof and disposed to be spaced apart from each other left and right, and one or more of the support slots may be provided on the plurality of sheet extensions.

The display apparatus may further include a front case, wherein the front case may include a panel seating portion on which edges of a rear surface of the display panel are seated, and a receiving portion formed by opening a portion of the panel seating portion to receive the front end of the support protrusion.

The front case may include a pressing portion protruding from an inner end of the panel seating portion to a rear side thereof to press the optical sheet to the rear side.

Another aspect of the present disclosure provides a display apparatus including a display panel, a backlight disposed in the rear of the display panel, an optical sheet disposed between the display panel and the backlight, and a middle mold configured to support the optical sheet, wherein the optical sheet includes a support slot extending left and right, the middle mold includes a support protrusion on which the optical sheet is caught, and a central portion of a front end of the support protrusion has an up-down width larger than an up-down width of the support slot and opposite sides of the front end of the support protrusion have an up-down width smaller than the up-down width of the support slot.

the support protrusion may include a pair of through portions extending downward from opposite sides of the front end of the sheet support portion, and the opposite sides of the front end of the support protrusion on which the pair of through portions are provided have the up-down width smaller than the up-down width of the support slot.

the support protrusion may include a protrusion portion protruding upward from a central portion of an upper surface of the sheet support portion, the protrusion portion is positioned in a rear of the locking portion, and a region in the support protrusion where the protrusion portion is formed has an up-down width smaller than the up-down width of the support slot.

Advantageous Effects

A support protrusion applied to a display apparatus according to the present disclosure is formed such that a central portion of a front surface thereof has an up-down width larger than an up-down width of a support slot and opposite sides of the front surface thereof have an up-down width smaller than the up-down width of the support slot, so that the support protrusion can easily pass through the support slot, and at the same time an optical sheet installed on the support protrusion can be prevented from being separated from the support protrusion.

MODE OF THE DISCLOSURE

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

The term "and/or" includes any combination of a plurality of related items or any one of a plurality of related items.

In this specification, the terms "front end," "rear end," "upper portion," "lower portion," "upper end" and "lower end" used in the following description are defined with reference to the drawings, and the shape and position of each component are not limited by these terms.

Hereinafter, embodiments of the present disclosure will be described in detail with reference to the accompanying drawings.

Figure 1:
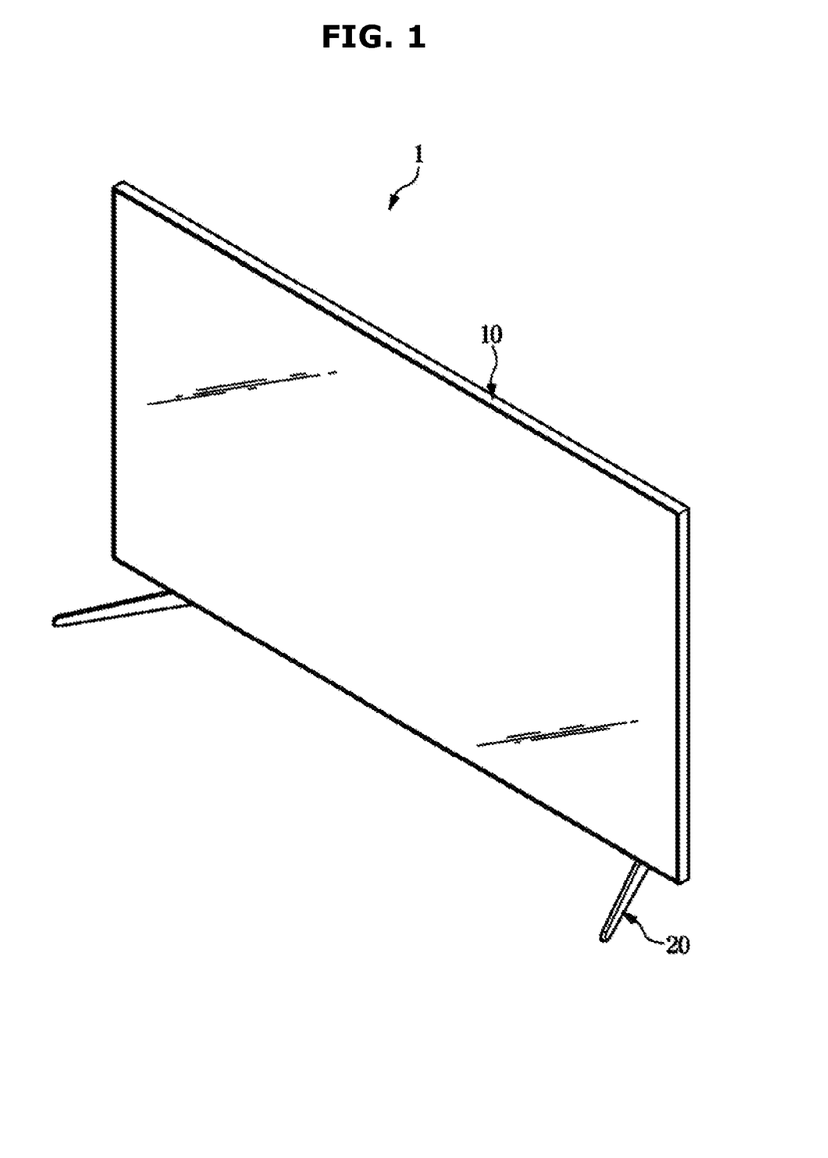
FIG. 1 is a perspective view of a display apparatus according to an embodiment of the present disclosure.

As illustrated in FIG. 1, a display apparatus 1 according to an embodiment of the present disclosure includes a display unit 10 to display an image and a stand 20 to support the display unit 10.

Figure 2:
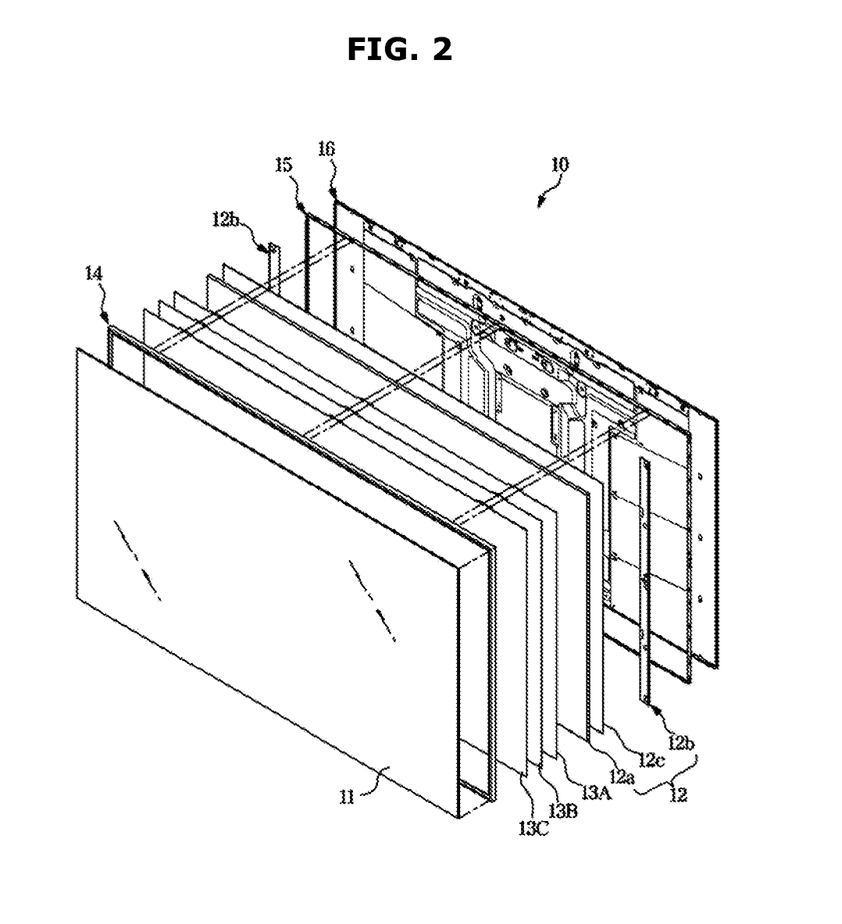
FIG. 2 is an exploded perspective view of a display unit according to an embodiment of the present disclosure.
Figure 3:
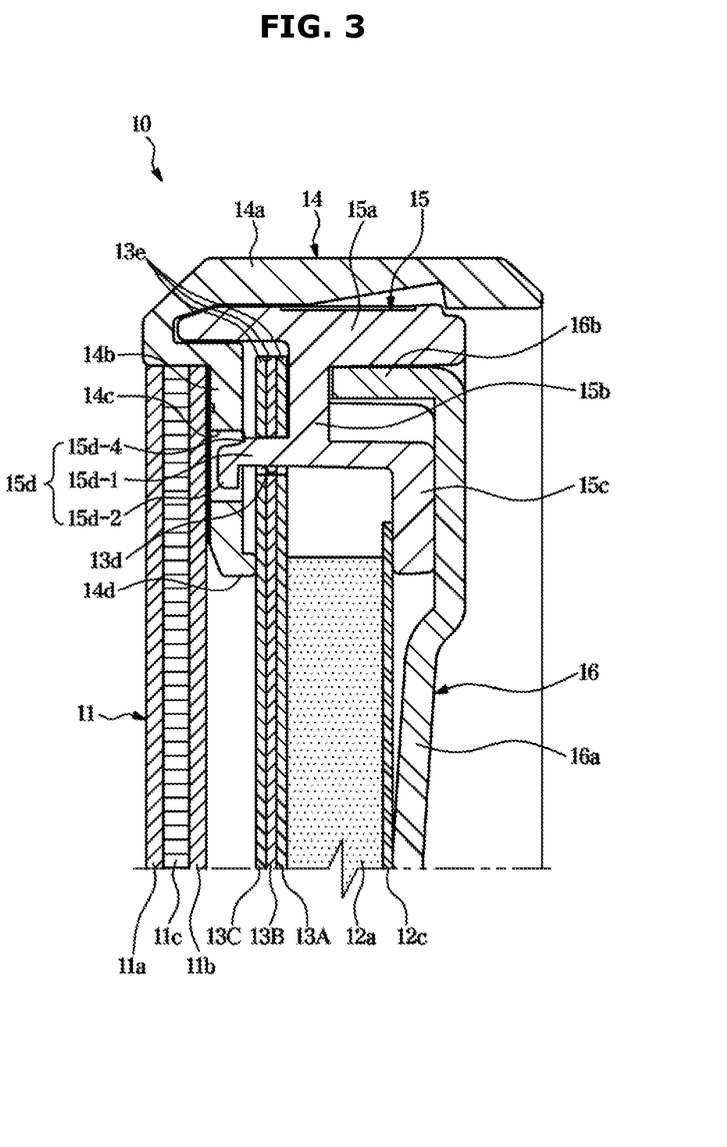
FIG. 3 is a cross-sectional view of an upper portion of the display unit according to an embodiment of the present disclosure.

As illustrated in FIGS. 2 and 3, the display unit 10 includes a display panel 11 on which an image is displayed, a backlight 12 disposed in the rear of the display panel 11 to supply light to the display panel 11, and optical sheets 13A, 13B, and 13C disposed between the display unit 10 and the backlight 12 to improve characteristics of light supplied to the display panel 11.

The display panel 11 includes a pair of glass substrates 11a and 11b formed in a rectangular plate shape, and a liquid crystal layer 11c disposed between the pair of glass substrates 11a and 11b.

The backlight 12 includes a light guide plate 12a formed in a rectangular plate shape, a pair of light sources 12b disposed opposite to opposite sides of the light guide plate 12a to generate light, and a reflective sheet 12c disposed on a rear surface of the light guide plate 12a.

The pair of light sources 12b each include a printed circuit board extending up and down to correspond to the opposite sides of the light guide plate 12a, and a plurality of light emitting diodes disposed to be vertically spaced apart from each other on one surface of the printed circuit board facing one side of the light guide plate 12a to generate light.

The reflective sheet 12c is formed of a white material to reflect light incident on a front surface thereof through the light guide plate 12a again into the light guide plate 12a.

The optical sheets 13A, 13B, and 13C are formed to have a thin thickness to have flexibility, so that the optical sheets 13A, 13B, and 13C may be bent. The optical sheets 13A, 13B, and 13C include the diffuser sheet 13A to receive and diffuse light emitted to a front side from the light guide plate 12a, the dual brightness enhancement film (DBEF) sheet 13B, which is a high-brightness prism sheet, disposed on the front side of the diffuser sheet 13A, and the quantum dot sheet 13C to improve color reproducibility.

The display unit 10 includes a front case 14 forming front edges and sides of the display unit 10, a bottom chassis 16 to support the backlight 12, and a middle mold 15 forming a space in which the backlight 12 and the optical sheets 13A, 13B, and 13C are accommodated.

Although not shown in the drawings, the display unit 10 includes various printed circuit boards installed on a rear surface of the bottom chassis 16 to control the operation of the display unit 10, and a rear case coupled to a rear side of the front case 14 to cover the rear surface of the bottom chassis 16 and the printed circuit boards.

The printed circuit board may include a power board to supply power to the display unit 10, a panel driving board to drive the display panel 11, a timing control board to transmit an image signal to the display panel 11, and a signal processing board to process image and sound signals.

The front case 14 includes a case portion 14a forming a bezel of the display unit 10 to surround upper, lower, left, and right sides of the display panel 11, a panel seating portion 14b extending inwardly from the case portion 14a to seat edges of a rear surface of the display panel 11, and a pressing portion 14d protruding from an inner end of the panel seating portion 14b to a rear side to press the optical sheets 13A, 13B, and 13C to the light guide plate 12a of the rear side thereof.

The edges of the rear surface of the display panel 11 are attached to a front surface of the panel seating portion 14b through an adhesive such as double-sided tape.

The bottom chassis 16 includes a rear portion 16a formed in a rectangular plate shape to support the light guide plate 12a, and four side portions 16b extending forward from upper, lower, left, and right ends of the rear portion 16a to be coupled to the middle mold 15. It is appropriate that the bottom chassis 16 is formed of a metal material such as aluminum in consideration of heat dissipation.

The middle mold 15 includes a frame portion 15a formed in a rectangular ring shape and coupled to an inner side of the case portion 14a of the front case 14, a rib portion 15b protruding inward from an inner surface of the frame portion 15a, and a bottom support portion 15c extending from an inner end of the rib part 15b to a rear side to be supported on a front surface of the rear portion 16a of the bottom chassis 16.

Accordingly, a space between the rear portion 16a of the bottom chassis 16 and the bottom support portion 15c forms a space in which the backlight 12 is installed, and a space between the frame portion 15a and the bottom support portion 15c forms a space in which the side portions 16b of the bottom chassis 16 are coupled.

The middle mold 15 supports the optical sheets 13A, 13B, and 13C so that the optical sheets 13A, 13B, and 13C are disposed between the display panel 11 and the backlight 12.

Figure 4:
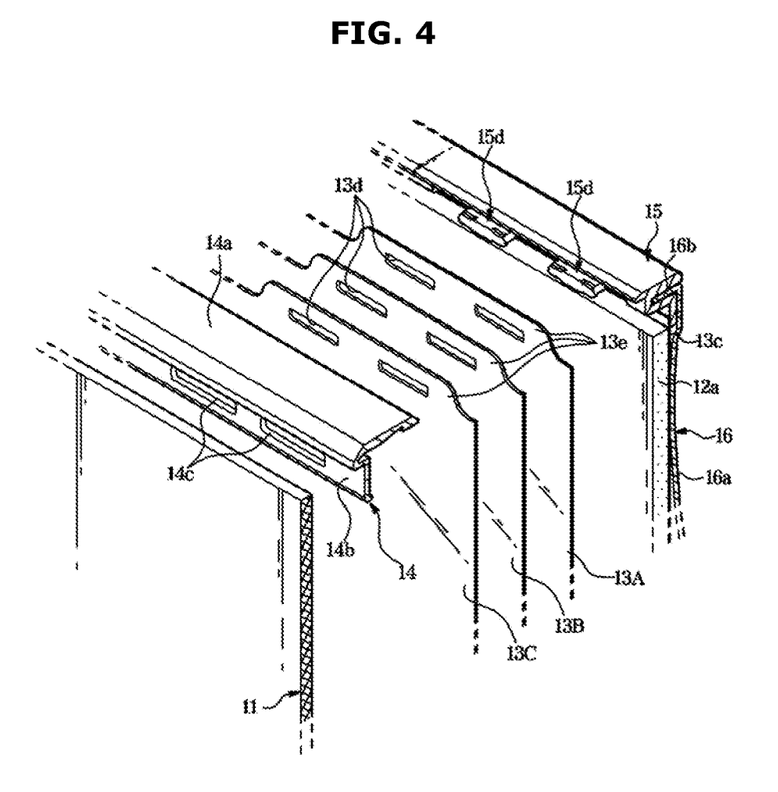
FIG. 4 is an exploded perspective view illustrating an installation of optical sheets according to an embodiment of the present disclosure.
Figure 5:
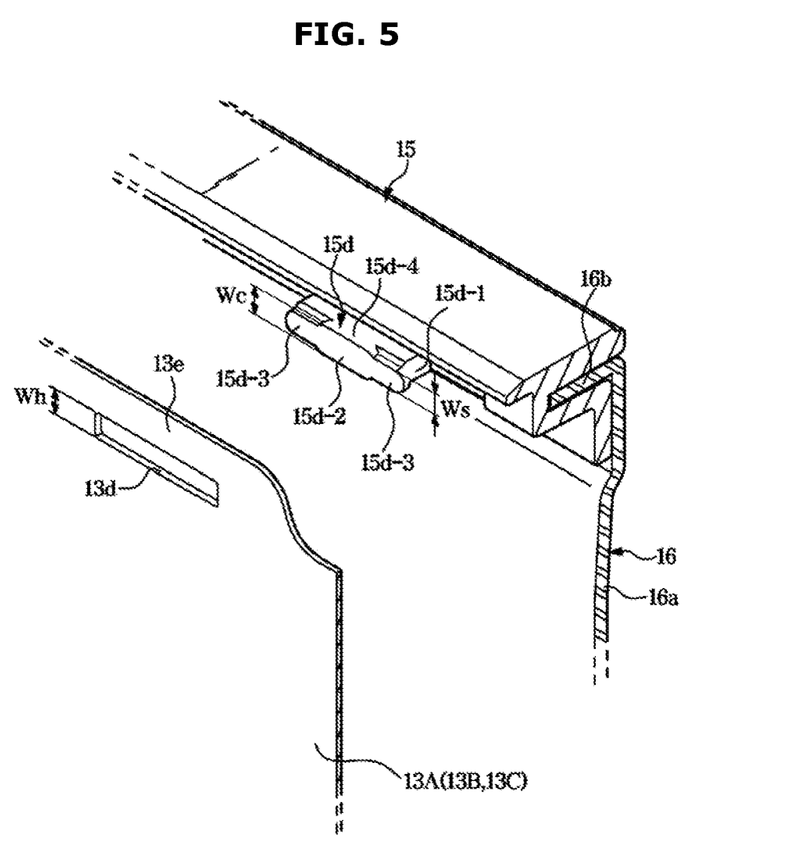
FIG. 5 is an enlarged perspective view illustrating a support protrusion and a support slot provided on the optical sheet according to an embodiment of the present disclosure.

As illustrated in FIGS. 4 and 5, the optical sheets 13A, 13B, 13C each include a plurality of support slots 13d extending left and right, and the middle mold 15 includes a plurality of support protrusions 15d to support the optical sheets 13A, 13B, and 13C through the support slots 13d. The plurality of support slots 13d is disposed to be spaced apart from each other left and right on the optical sheets 13A, 13B, and 13C, and the plurality of support protrusions 15d is disposed to be spaced apart from each other left and right at positions of the middle mold 15 corresponding to the support slots 13d.

The optical sheets 13A, 13B, and 13C each include a plurality of sheet extensions 13e in which the support slots 13d are provided, respectively. The sheet extensions 13e extend upward from upper ends of the optical sheets 13A, 13B, and 13C and are disposed to be spaced apart from each other left and right. Each of the sheet extensions 13e is provided with the at least one support slot 13d. In this embodiment, the optical sheets 13A, 13B, and 13C each include three of the sheet extensions 13e, and two of the support slots 13d are disposed to be spaced apart from each other left and right on each of the sheet extensions 13e.

As described above, the support slots 13d are provided on the sheet extensions 13e, but the present disclosure is not limited thereto. That is, the support slots 13d may be provided at the upper ends of the optical sheets 13A, 13B, and 13C without the need for the sheet extension 13e to be formed.

Figure 6:
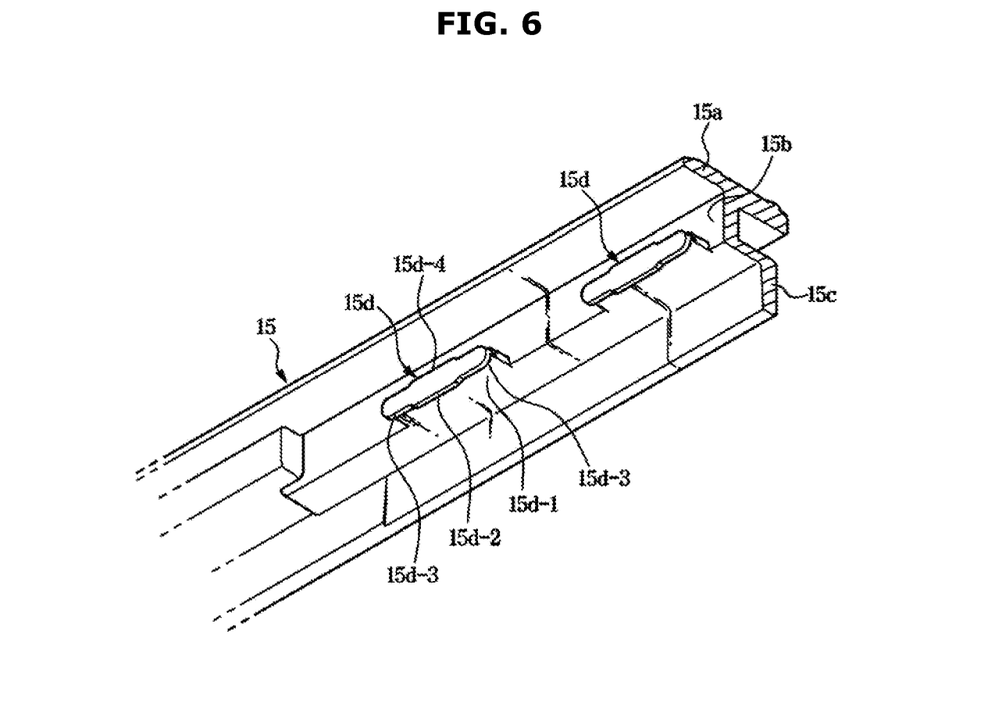
FIG. 6 is a bottom perspective view of the support protrusion according to an embodiment of the present disclosure.

As illustrated in FIGS. 5 and 6, the support protrusion 15d includes a sheet support portion 15d-1 protruding forward from the rib portion 15b of the middle mold 15 and on which the optical sheets 13A, 13B, and 13C are supported, a locking portion 15d-2 provided on a central portion of an front end of the sheet support portion 15d-1, two through portions 15d-3 provided on opposite sides of the front end of the sheet support portion 15d-1, and a protrusion portion 15d-4 protruding upward from a central portion of an upper surface of the sheet support portion 15d-1.

The sheet support portion 15d-1 extends in the front-rear direction and is inserted into the support slots 13d provided on the optical sheets 13A, 13B, and 13C to support the optical sheets 13A, 13B, and 13C. The sheet support portion 15d-1 extends to have a left-right width of a predetermined length or more, but has the left-right width slightly smaller than that of the support slot 13d. Also, the sheet support portion 15d-1 has an up-down width smaller than that of the support slot 13d.

The locking portion 15d-2 extends downward from the central portion of the front end of the sheet support portion 15d-1. The locking portion 15d-2 is caught in the vicinity of the support slots 13d of the optical sheets 13A, 13B, and 13C to prevent the optical sheets 13A, 13B, and 13C from being separated from the sheet support portion 15d-1. A central portion of a front end of the support protrusion 15d has an up-down width larger than that of the support slot 13d by the locking portion 15d-2.

The through portions 15d-3 extend downward from the opposite sides of the front end of the sheet support portion 15d-1, but are formed to have an up-down width smaller than that of the locking portion 15d-2. Opposite sides of the front end of the support protrusion 15d on which the through portions 15d-3 are formed have an up-down width smaller than that of the support slot 13d.

That is, the central portion of the front end of the support protrusion 15d has the up-down width larger than that of the support slot 13d, and the opposite sides of the front end of the support protrusion 15d has the up-down width smaller than that of the support slot 13d. Therefore, when an operator inserts the support protrusion 15d into the support slots 13d, as the opposite sides of the front end of the support protrusion 15d first pass through the support slots 13d, the optical sheets 13A, 13B, and 13C are bent. As the optical sheets 13A, 13B, and 13C are bent, widths of central portions of the support slots 13d temporarily increase, and in this state, the central portion of the front end of the support protrusion 15d also passes through the support slots 13d. After the front end of the support protrusion 15d passes through the support slots 13d, the optical sheets 13A, 13B, and 13C spread again, so that a lower end of the locking portion 15d-2 is caught in the vicinity of the support slots 13d of the optical sheets 13A, 13B, and 13C.

The protrusion portion 15d-4 extends back and forth along the sheet support portion 15d-1, but a front end thereof is positioned in the rear of the locking portion 15d-2. An up-down width of a region in the support protrusion 15d where the protrusion portion 15d-4 is formed is smaller than the up-down width of the support slot 13d.

Accordingly, after the front end of the support protrusion 15d, that is, a region in the support protrusion 15d where the locking portion 15d-2 is formed passes through the support slots 13d, the optical sheets 13A, 13B and 13C move upward by a thickness of the protrusion portion 15d-4. Therefore, a region in the locking portion 15d-2, which is caught in the vicinity of the support slots 13d of the optical sheets 13A, 13B, and 13C, increases by the thickness of the protrusion portion 15d-4, so that the optical sheets 13A, 13B, and 13C are more reliably prevented from being separated from the support protrusion 15d.

As illustrated in FIGS. 2 and 4, the front case 14 includes receiving portions 14c formed by partially opening the panel seating portion 14b. The receiving portions 14c are provided at positions corresponding to the support protrusions 15d to receive the frond ends of the support protrusions 15d.

Accordingly, when the middle mold 15 is coupled to the front case 14 in a state in which the optical sheets 13A, 13B, and 13C are supported on the support protrusion 15d, the front end of the support protrusion 15d is received in the receiving portion 14c provided on the panel seating portion 14b, and at the same time upper portions of the optical sheets 13A, 13B, and 13C are pressed to the light guide plate 12a positioned in the rear side thereof by the pressing portion 14d of the front case 14, so that the optical sheets 13A, 13B, and 13C are more reliably prevented from being separated from the support protrusion 15d.

In this embodiment, the support protrusion 15d includes the through portions 15d-3 extending downward from the opposite sides of the front end thereof, but the present disclosure is not limited thereto. That is, the support protrusion 15d may include only the locking portion 15d-2 provided on the central portion thereof.

In this embodiment, the locking portion 15d-2 extends downward from the central portion of the front end of the sheet support portion 15d-1, and the protrusion portion 15d-4 is formed on the central portion of the upper surface of the sheet support portion 15d-1, but the present disclosure is not limited thereto.

Figure 7:
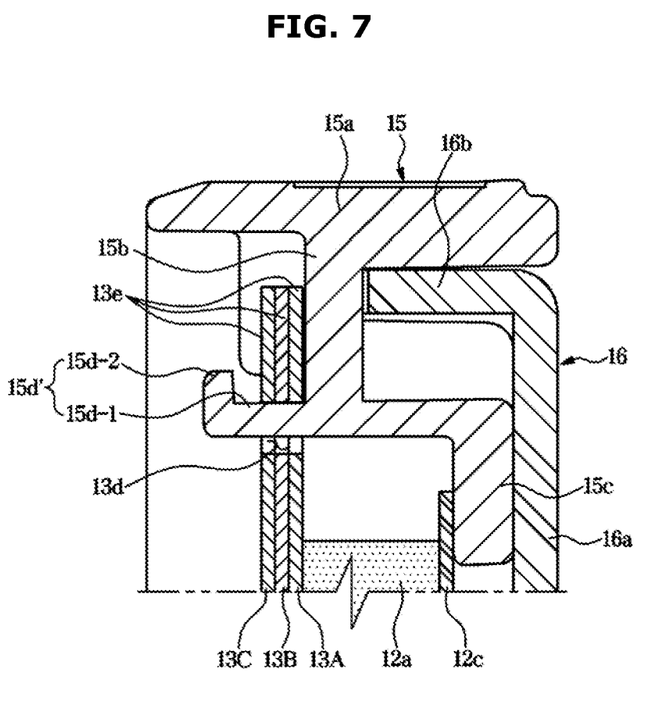
FIG. 7 is a cross-sectional view of a support protrusion and an optical sheet according to another embodiment of the present disclosure.
Figure 8:
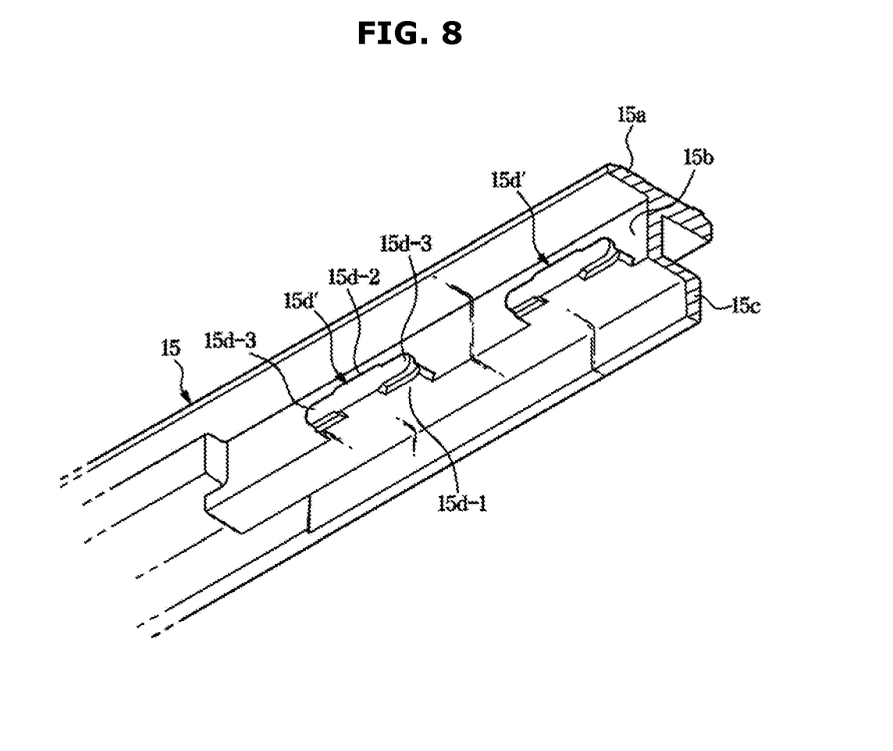
FIG. 8 is a bottom perspective view of the support protrusion according to another embodiment of the present disclosure.

As illustrated in FIGS. 7 and 8, the support protrusion 15d' of a middle mold 15 may include the locking portion 15d-2 extending upward from the central portion of the front end of the sheet support portion 15d-1. In this case, the optical sheets 13A, 13B and 13C move downward by own weights thereof after the front end of the support protrusion 15d passes through the support slots 13d, so that upper ends of the support slots 13d of the optical sheets 13A, 13B, and 13C are supported on the upper surface of the sheet support portion 15d-1.

In the above embodiments, the support protrusion 15d' includes the locking portion 15d-2 extending downward from the front end of the sheet support portion 15d-1, and the protrusion portion 15d-4 protruding from the central portion of the upper surface of the sheet support portion 15d-1, but the present disclosure is not 15 limited thereto.

Figure 9:
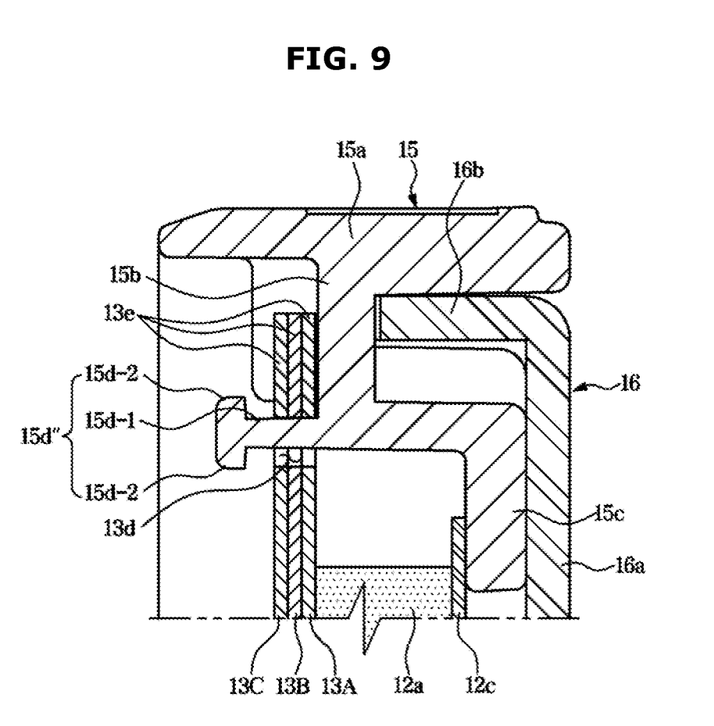
FIG. 9 is a cross-sectional view of a support protrusion and an optical sheet according to another embodiment of the present disclosure.
Figure 10:
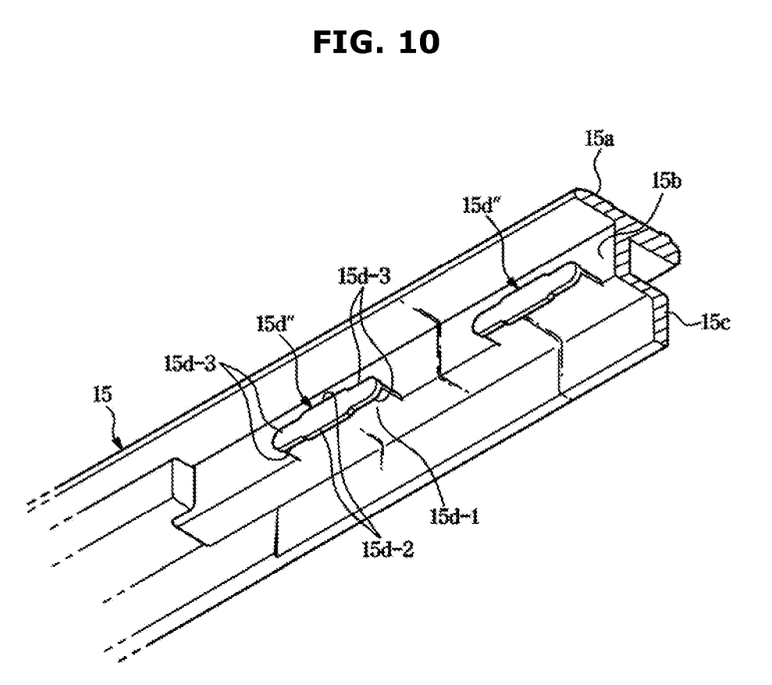
FIG. 10 is a bottom perspective view of the support protrusion according to another embodiment of the present disclosure.

As illustrated in FIGS. 9 and 10, without a configuration corresponding to the protrusion portion 15d-4, the support protrusion 15d" of a middle mold 15 may include a pair of the locking portions 15d-2 extending upward and downward from the central portion of the front end of the sheet support portion 15d-1, and two pairs of the through portions 15d-3 extending upward and downward from the opposite sides of the front end of the sheet support portion 15d-1.

In the above embodiments, the backlight 12 is configured as an edge type backlight including the light guide plate 12a and light emitting diodes supplying light to opposite sides thereof, but the present disclosure is not limited thereto.

Although not shown in the drawings, the backlight may be configured as a direct type backlight including a plurality of light emitting diodes disposed to be spaced apart from each other up, down, left, and right on a front surface of the bottom chassis.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
   a display panel;
   a front case;
   a backlight disposed in a rear of the display panel;
   an optical sheet disposed between the display panel and the backlight; and
   a middle mold configured to support the optical sheet,
   wherein: the optical sheet comprises a support slot extending left and right;
   the middle mold comprises a support protrusion to support the optical sheet through the support slot;
   the support protrusion comprises a sheet support portion protruding from the middle mold and extending left and right, and a locking portion extending in an up-down direction from a central portion of a front end of the sheet support portion;
   the central portion of a front end of the sheet support portion on which the locking portion is formed has an up-down width larger than an up-down width of the support slot; and
   opposite sides of the front end of the support protrusion have an up-down width smaller than the up-down width of the support slot,
   wherein the front case comprises a panel seating portion on which edges of a rear surface of the display panel are seated, and a receiving portion formed by opening a portion of the panel seating portion to receive the front end of the support protrusion.

2. The display apparatus according to claim 1, wherein the locking portion extends downward from the front end of the sheet support portion.

3. The display apparatus according to claim 2, wherein the support protrusion comprises a protrusion portion protruding upward from a central portion of an upper surface of the sheet support portion;
   the protrusion portion is positioned in a rear of the locking portion; and
   a region in the support protrusion where the protrusion portion is formed has an up-down width smaller than the up-down width of the support slot.

4. The display apparatus according to claim 2, wherein the support protrusion comprises a pair of through portions extending downward from opposite sides of the front end of the sheet support portion; and
   the opposite sides of the front end of the support protrusion on which the pair of through portions are provided have the up-down width smaller than the up-down width of the support slot.

5. The display apparatus according to claim 1, wherein the locking portion extends upward from the front end of the sheet support portion.

6. The display apparatus according to claim 5, wherein the support protrusion comprises a pair of through portions extending upward from opposite sides of the front end of the sheet support portion; and
   the opposite sides of the front end of the support protrusion on which the pair of through portions are provided have the up-down width smaller than the up-down width of the support slot.

7. The display apparatus according to claim 1, wherein the locking portions extend upward and downward from the central portion of the front end of the sheet support portion, respectively.

8. The display apparatus according to claim 7, wherein the support protrusion comprises two pairs of through portions extending upward and downward from opposite sides of the front end of the sheet support portion, respectively; and
   the opposite sides of the front end of the support protrusion on which the two pair of through portions are provided have the up-down width smaller than the up-down width of the support slot.

9. The display apparatus according to claim 1, wherein the optical sheet comprises at least one of a diffuser sheet to diffuse light received from the backlight, a dual brightness enhancement film (DBEF) sheet which is a high-brightness prism sheet, and a quantum dot sheet to improve color reproducibility.

10. The display apparatus according to claim 1, wherein the optical sheet comprises a plurality of sheet extensions extending from an upper end thereof and disposed to be spaced apart from each other left and right; and
one or more of the support slots are provided on the plurality of sheet extensions.

11. The display apparatus according to claim 1, wherein the front case comprises a pressing portion protruding from an inner end of the panel seating portion to a rear side thereof to press the optical sheet to the rear side.

* * * * *